United States Patent
Yanagita et al.

(10) Patent No.: US 8,389,961 B2
(45) Date of Patent: Mar. 5, 2013

(54) CLEANING METHOD OF RADIATION IMAGE CONVERSION PANEL, AND METHOD OF READING IMAGE INFORMATION AND IMAGE INFORMATION READING APPARATUS

(75) Inventors: Takafumi Yanagita, Tokyo (JP); Shinichi Okamura, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 378 days.

(21) Appl. No.: 12/595,883

(22) PCT Filed: Apr. 14, 2008

(86) PCT No.: PCT/JP2008/057265
§ 371 (c)(1),
(2), (4) Date: Oct. 14, 2009

(87) PCT Pub. No.: WO2008/133078
PCT Pub. Date: Nov. 6, 2008

(65) Prior Publication Data
US 2010/0117005 A1    May 13, 2010

(30) Foreign Application Priority Data

Apr. 17, 2007 (JP) ................................. 2007-107993

(51) Int. Cl.
*G01T 1/105* (2006.01)
(52) U.S. Cl. ................ 250/473.1; 250/370.09; 250/581; 250/584; 250/588; 250/589
(58) Field of Classification Search ............ 250/370.09, 250/473.1, 581, 584, 588, 589
See application file for complete search history.

(56) References Cited

U.S. PATENT DOCUMENTS

| | | | |
|---|---|---|---|
| 4,543,479 A * | 9/1985 | Kato | 250/590 |
| 7,355,184 B2 * | 4/2008 | Nagano | 250/370.11 |
| 7,456,410 B2 * | 11/2008 | Nagano | 250/370.11 |
| 7,642,519 B2 * | 1/2010 | Nagano | 250/370.11 |
| 2002/0106229 A1 * | 8/2002 | Meier et al. | 400/701 |
| 2004/0195514 A1 * | 10/2004 | Nagano | 250/370.11 |
| 2005/0281585 A1 * | 12/2005 | Umeki et al. | 399/123 |

FOREIGN PATENT DOCUMENTS

| | | |
|---|---|---|
| EP | 1826611 A1 * | 8/2007 |
| JP | 2001242570 | 9/2001 |

(Continued)

OTHER PUBLICATIONS

JP2006-329757 and JP 2007-008701 machine translations.*
Translation of JP2005043050A.*

*Primary Examiner* — David Porta
*Assistant Examiner* — Djura Malevic
(74) *Attorney, Agent, or Firm* — Lucas & Mercanti, LLP

(57) ABSTRACT

It is a feature that in the present invention, provided is a method of cleaning a radiation image conversion panel possessing a substrate and provided thereon, a phosphor layer, and further possessing a protective layer provided on the phosphor layer, wherein a surface of the protective layer is cleaned by moving a cleaning member, while applying a pressure of 1 mN/cm$^2$-1 N/cm$^2$ to the surface of the protective layer with the cleaning member. Also provided can be a method of cleaning a radiation image conversion panel to provide an image information reading method by which image information exhibiting reduced image defect and image unevenness without damaging the radiation image conversion panel can be read out.

6 Claims, 1 Drawing Sheet

FOREIGN PATENT DOCUMENTS

| | | |
|---|---|---|
| JP | 2001321731 | 11/2001 |
| JP | 2001337402 | 12/2001 |
| JP | 2002048872 | 2/2002 |
| JP | 2005043050 A * | 2/2005 |
| JP | 2006329757 | 12/2006 |
| JP | 2007008701 | 1/2007 |
| WO | 2006064636 | 6/2006 |

* cited by examiner

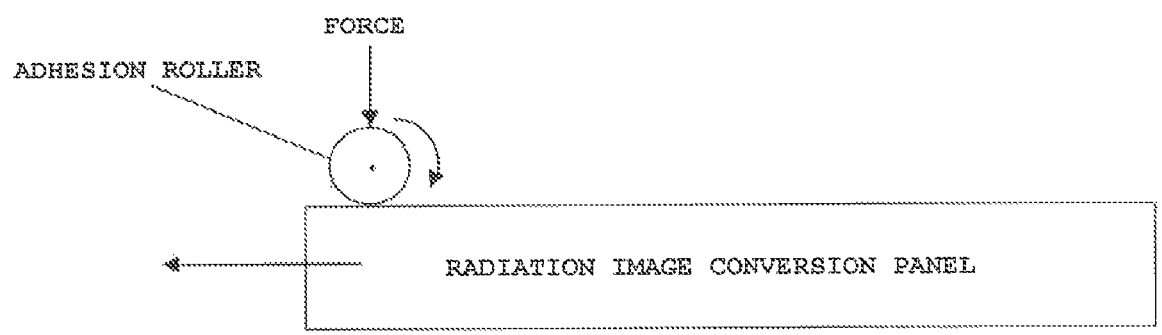

CLEANING METHOD OF RADIATION IMAGE CONVERSION PANEL, AND METHOD OF READING IMAGE INFORMATION AND IMAGE INFORMATION READING APPARATUS

CROSS REFERENCE TO RELATED APPLICATION

This is a U.S. National Phase Application under 35 U.S.C. 371 of International Application PCT/JP2008/057265, filed Apr. 14, 2008, which claims the priority of Japanese Application No. 2007-107993, filed Apr. 17, 2007, the entire content of both Applications are hereby incorporated by reference.

TECHNICAL FIELD

The present invention relates to a cleaning method for a radiation image conversion panel in which a phosphor layer is provided on a substrate, and a protective layer is further provided on the phosphor layer.

BACKGROUND

For a method of imaging a radiation image without using a silver halide in order to obtain the radiation image, a radiation image conversion panel in which a stimulable phosphor layer is provided on a support has been developed. Radiation energy depending on a radiation transmittance density at each part of an object can be accumulated with the radiation image conversion panel by exposing a stimulable phosphor layer to radiation passing through the object. The stimulable phosphor is subsequently excited on a time series basis with electromagnetic waves (stimulating light) such as visible light and infrared radiation to emit radiation energy accumulated in the stimulable phosphor as stimulated luminescence. The signal based on light intensity can be reproduced as a visible image on a recording material such as a silver halide photosensitized material or the like, and on a display device such as CRT or the like by obtaining an electrical signal via photoelectric conversion, for example. It is well known that superiority or inferiority of the radiation image conversion system using the radiation image conversion panel, is largely influenced by luminance of the stimulated luminescence of the panel and the luminescence uniformity of the panel, and specifically, these characteristics are largely influenced by the characteristics of the stimulable phosphor to be used.

A radiation image conversion panel fitted with a stimulable phosphor in which Eu is activated to alkali halide such as CsBr or the like as a base material has recently been proposed, and it is expected to enable improvement of X-ray conversion efficiency which used to be impossible by specifically utilizing Eu as an activator, whereby presumably, the radiation image conversion panel is largely to be utilized for a medical X-ray image diagnosis apparatus and so forth.

It is known that the radiation image conversion panel has a structure in which a protective layer (protective film) to cover a stimulable phosphor layer is provided to protect the stimulable phosphor layer from humidity, oxidation or the like after forming the stimulable phosphor layer on a support made of each kind of polymeric material, glass, metal or the like via evaporation of the above-described stimulable phosphor, as described in Japanese Patent O.P.I. Publication No. 2001-83299.

The radiation image conversion panel having such the structure is not favorable because of appearance of image defects in cases where dust larger than a pitch of an image reading apparatus installed in the X-ray image diagnosis apparatus adheres onto the stimulable phosphor layer. For this reason, as to the image reading apparatus installed in the X-ray image diagnosis apparatus, studied have been methods to remove dust attached on a protective layer (protective film) of a radiation image conversion panel thereof, and to reduce image defects. Known is a method of cleaning the surface of a protective layer (protective film) employing a rotatable brush roller brought into contact with the surface of the protective layer (protective film) and an apparatus by which dust removed with the brush roller is suctioned (refer to Patent Document 1, for example). Known is a method of cleaning the surface of a protective layer (protective film) by providing a flat brush brought into contact with the surface of the protective layer (protective film) in the conveyance path of the radiation image conversion panel (refer to Patent Document 2, for example).

Also known is a method of cleaning a stimulable phosphor layer to clean the surface of the foregoing stimulable phosphor layer employing a cleaning apparatus before sealing a stimulable phosphor plate having the stimulable phosphor layer provided on a substrate with a sealing film (refer to Patent Document 3, for example).

However, scratches are easily produced via concentration of stress into the protective layer provided on top of the stimulable phosphor layer, since the stimulable phosphor layer is in a delicate situation because of no phosphor coated with a binding agent or the like, and the surface of the stimulable phosphor layer is hard. Methods of touching the surface to be cleaned as described in Patent Documents 1 and 2 are not favorable since scratches are made on the surface of the stimulable phosphor layer. In addition, in the case of Patent Document 3, claggy dust can not be removed in use.

In such the situation, development of a method of cleaning a radiation image conversion panel exhibiting reduced surface scratch, image defects and image unevenness has been demanded.

Patent Document 1: Japanese Patent O.P.I. Publication No. 2001-337402.
Patent Document 2: Japanese Patent O.P.I. Publication No. 2001-321731.
Patent Document 3: Japanese Patent O.P.I. Publication No. 2006-329757.

DISCLOSURE OF THE INVENTION

Problems to be Solved by the Invention

It is an object of the present invention to provide a method of cleaning a radiation image conversion panel exhibiting reduced image defect and image unevenness without damaging the radiation image conversion panel.

Means to Solve the Problems

The above-described object of the present invention can be accomplished by the following structures.

(Structure 1) A method of cleaning a radiation image conversion panel comprising a substrate and provided thereon, a phosphor layer, and further comprising a protective layer provided on the phosphor layer, wherein a surface of the protective layer is cleaned by moving a cleaning member, while applying a pressure of 1 mN/cm$^2$-1 N/cm$^2$ to the surface of the protective layer with the cleaning member.

(Structure 2) The method of Structure 1, wherein the phosphor layer comprises a plurality of columnar crystals in which a tip of each of the columnar crystals is thinner than a base portion of the each.

(Structure 3) The method of Structure 1 or 2, wherein the cleaning member comprises a base material in the form of a sheet exhibiting a thickness deformation ratio of the cleaning member of 20-80%, when applying a pressure of $1N/cm^2$.

(Structure 4) The method of Structure 1 or 2, wherein the cleaning member is an adhesion roller.

(Structure 5) The method of any one of Structures 1-4, wherein the phosphor layer comprises CsBr as a phosphor.

(Structure 6) A method of reading image information, comprising the step of reading the image information via accumulation of the image information in a radiation image conversion panel comprising a substrate and provided thereon a phosphor layer on which a protective layer is provided, wherein the method comprises a cleaning process before reading the image information or before accumulating the image information, by the method of any one of Structures 1-5.

(Structure 7) An image information reading apparatus employed for the method of Structure 6, comprising a cleaning device comprising a cleaning member.

Effect of the Invention

In the present invention, provided can be a method of cleaning a radiation image conversion panel to provide an image information reading method by which image information exhibiting reduced image defect and image unevenness without damaging the radiation image conversion panel can be read out.

DESCRIPTION OF THE PREFERRED EMBODIMENTS

The present invention will be further described in detail. It is a feature that in the present invention, provided is a method of cleaning a radiation image conversion panel possessing a substrate and provided thereon, a phosphor layer, and further possessing a protective layer provided on the phosphor layer, wherein a surface of the protective layer is cleaned by moving a cleaning member, while applying a pressure of $1 mN/cm^2$-$1 N/cm^2$ to the surface of the protective layer with the cleaning member.

In the present invention, while the surface of the protective layer in the radiation image conversion panel is subjected to applying a pressure of $1 mN/cm^2$-$1 N/cm^2$ specifically with a cleaning member, the cleaning member is moved to clean the surface of the protective member, whereby provided is an image information reading method by which image information exhibiting reduced image defect and image unevenness without damaging the radiation image conversion panel can be read out.

[Substrate]

The substrate used for the radiation image conversion panel of the present invention will be described below.

As the substrate employed for the radiation image conversion panel of the present invention, various kinds of glass, polymer materials, metal and so forth are used, including, and examples thereof include plate glass such as quartz, borosilicate glass, chemically-hardened glass or the like; an organic resin film such as a cellulose acetate film, a polyester film, a polyethylene terephthalate film, a polyimide film, a polyimide film, a triacetate film, a polycarbonate film or the like; and a metal sheet such as an aluminum sheet, an iron sheet, a copper sheet or the like, or a metal sheet having a coating layer composed of metal oxide thereof. Of these, the organic resin film is preferable. In the case of the organic resin film, evaporated crystals obtained via evaporation can be penetrated inside the substrate by controlling the substrate temperature to the softening point or higher. The penetrating amount can be controlled by not only the substrate temperature but also incidence speed of vapor and vapor temperature. These incidence speed of vapor and temperature can be controlled by temperature during vaporization of evaporation raw material. In cases where a metal or glass substrate is selected, a subbing layer described below is desired to be provided.

[Subbing Layer]

A subbing layer is preferably provided between a substrate and a stimulable phosphor layer.

Resins employed for the subbing layer are not specifically limited, but examples thereof include polyvinyl alcohol, polyvinyl butyral, polyvinyl formal, polycarbonate, a polyester resin, polyethylene terephthalate, polyethylene, nylon, a (meth)acrylic acid or (meth)acrylate, vinyl esters, vinyl ketones, styrenes, diolefins, (meth)acrylamides, vinyl chlorides, vinylidene chlorides, cellulose derivatives such as nitrocellulose, acetyl cellulose, diacetyl cellulose and so forth, a silicon resin, a polyurethane resin, a polyamide resin, various kinds of synthetic rubber based resins, a phenol resin, an epoxy resin, a urea resin, a melamine resin, a phenoxy resin, and so forth. Of these, hydrophobic resins such as the polyester resin, the polyurethane resin and so forth are preferable in view of adhesion between the substrate and the stimulable phosphor layer, and an anti-corrosion property of the substrate.

The subbing layer has a layer thickness of 0.1-10 µm, preferably has a layer thickness of 1-5 µm. When the subbing layer has a layer thickness of less than 0.1 µm, adhesion force between the substrate and the stimulable phosphor layer tends to decrease in some cases, and when the subbing layer has a layer thickness exceeding 10 µm, aging stability in quality such as sharpness and so forth tends to be degraded.

Measurements can be conducted by a commonly known surface roughness measurement method such as a stylus method or a laser gauge interferometory method.

The subbing layer may contain a crosslinking agent to enhance its film strength in addition to a resin. Usable crosslinking agents are not specifically limited, and examples thereof include polyfunctional isocyanates and derivatives thereof, melamines and derivatives thereof, amino resins and derivatives thereof, but polyfunctional isocyanate compounds are preferable. Examples of the polyfunctional isocyanate compounds include CORONATE HX, CORONATE 3041 and so forth (produced by Nippon Polyurethane Industry Co., Ltd.).

The consumption amount of the crosslinking agent varies depending on the characteristics of the targeted radiation image conversion panel, kinds of material used for the stimulable phosphor layer and the substrate, and kinds of resins used for the subbing layer, but in consideration of maintaining of adhesion strength between the stimulable phosphor layer and the substrate, the consumption amount of at most 50% by weight is preferable, and the consumption amount of 5-30% by weight is more preferable based on the resin constituting the subbing layer in view of heat resistance, strength and toughness with the subbing layer.

Prior to coating of the stimulable phosphor layer after coating the subbing layer on the substrate, a heat treatment is preferably carried out at 40-150° C. for 1-100 hours to complete reaction between the resin in the subbing layer and the crosslinking agent.

The subbing layer is prepared by coating a subbing layer coating solution on the substrate, followed by drying. Coating methods are not specifically limited, and coating is conducted employing commonly known coaters such as a doctor blade coater, a roll coater, a knife coater, an extrusion coater, and also a spin coater.

[Stimulable Phosphor]

The stimulable phosphor layer of the present invention will be described.

As the phosphor used for the stimulable phosphor layer of the present invention, stimulable phosphor is preferable, and the stimulable phosphor represented by the following Formula (1) is specifically preferable.

$$M^1X \cdot aM^2X'_2:eA,A'' \quad \text{Formula (1)}$$

wherein $M^1$ represents at least one alkali metal atom selected from the group consisting of Li, Na, K, Rb, and Cs; $M^2$ represents at least one divalent metal atom selected from the group consisting of Be, Mg, Ca, Sr, Ba, Zn, Cd, Cu and Ni; X and X' represent at least one halogen atom selected from the group consisting of F, Cl, Br and I; A and A'' represent at least one rare earth atom selected from the group consisting of Eu, Tb, In, Ce, Tm, Dy, Pr, Ho, Nd, Yb, Er, Gd, Lu, Sm and Y; and "a" and "e" represent a numeric value in the range of $0 \leq a \leq 0.5$ and $0 < e \leq 0.2$, respectively.

In the stimulable phosphor represented by Formula (1), $M^1$ represents at least one alkali metal atom selected from the group consisting of Na, K, Rb, and Cs. Of these, at least one alkali metal atom selected from the group consisting of Rb and Cs is preferable, but a Cs atom is more preferable.

$M^2$ represents at least one divalent metal atom selected from the group consisting of Be, Mg, Ca, Sr, Ba, Zn, Cd, Cu and Ni. Of these, divalent metal atoms selected from the group consisting of Be, Mg, Ca, Sr and Ba are preferable.

A represents at least one metal atom selected from the group consisting of Eu, Tb, In, Ga, Ce, Tm, Dy, Pr, Ho, Nd, Yb, Er, Gd, Lu, Sm, Y, Tl, Na, Ag, Cu, and Mg.

From the viewpoint of enhancing luminance of stimulated luminescence, at least one halogen atom selected from the group consisting of F, Cl and Br is preferable, though X and X' represent at least one halogen atom selected from the group consisting of F, Cl, Br and I. However, at least one halogen atom selected from the group consisting of Br and I is more preferable.

The stimulable phosphor represented by Formula (1) is manufactured, for example, by a manufacturing method described below.

As phosphor raw materials, (a) at least one or at least two compounds selected from the group consisting of NaF, NaCl, NaBr, NaI, KF, KCl, KBr, KI, RbF, RbCl, RbBr, RbI, CsF, CsCl, CsBr and CsI is (are) utilized.

Further, (b) at least one or at least two compounds selected from the group consisting of $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $BaI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$ is (are) utilized.

Further, (c) compounds containing metal atoms selected from the group consisting of Eu, Tb, In, Cs, Ce, Tm, Dy, Pr, Ho, Nd, Yb, Er, Gd, Lu, Sm, Y, Tl, Na, Ag, Cu and Mg are utilized in Formula (1).

In the compound represented by Formula (1), "a" represents a numeric value in the range of $0 \leq a < 0.5$ but preferably represents a numeric value in the range of $0 \leq a < 0.01$, and "e" represents a numeric value in the range of $0 \leq e \leq 0.2$ but a numeric value in the range of $0 < e \leq 0.1$ is preferable.

Further, the stimulable phosphor layer is preferably prepared by a vapor deposition method.

Examples of the vapor deposition method of the stimulable phosphor layer include an evaporation method, a sputtering method, a CVD method, an ion plating method and other methods.

For example, the following methods are provided.

In the evaporation method as the first method, initially, a substrate is placed inside an evaporator, followed by being exhausted to a vacuum degree of about $1.333 \times 10^{-4}$ Pa. At least one of the foregoing stimulable phosphors is vaporized via heat by a resistance heating method or an electron beam method to allow the stimulable phosphor layer to be grown to the desired thickness on the substrate. Consequently, a stimulable phosphor layer containing no binder is formed, but in the foregoing evaporation process, it is also possible to form the stimulable phosphor layer in plural process steps.

Further, in the foregoing evaporation process, it is possible to synthesize the targeted stimulable phosphor on the substrate and to form a stimulable phosphor layer thereon simultaneously via a co-evaporation method employing a plurality of resistance heaters or electron beams.

After completion of the evaporation, it is preferable to produce the radiation image conversion panel of the present invention by placing a protective layer on the side opposite to the substrate side of the stimulable phosphor layer, if desired. In addition, a substrate may be provided after forming a stimulable phosphor layer on a protective layer.

Further, in the foregoing evaporation method, an evaporated body (a substrate, a protective layer or an intermediate layer) is preferably heated during evaporation, if desired. A phosphor layer having desired shape can be obtained by conducting evaporation at temperature higher than softening temperature of a substrate or a subbing layer.

Further, the stimulable phosphor layer may be subjected to a heat treatment after completion of the evaporation. In the foregoing evaporation method, reactive evaporation may also be carried out by introducing gas such as $O_2$ or $H_2$, if desired.

In a sputtering method as the second method, similarly to the evaporation method, a substrate fitted with a protective layer or an intermediate layer is placed inside the sputtering apparatus, followed by being temporarily exhausted to a vacuum degree of about $1.333 \times 10^{-4}$ Pa. Subsequently, inert gas such as Ar, Ne or the like as a gas for sputtering is introduced into the inside of the sputtering apparatus to adjust gas pressure to approximately $1.333 \times 10^{-1}$ Pa. Thereafter, the foregoing stimulable phosphor is sputtered as a sputtering target to allow a stimulable phosphor layer to be grown to the desired thickness on the substrate.

In the sputtering process, similarly to the evaporation method, various kinds of application treatment are usable.

The third method is a CVD method, and the fourth method is an ion plating method.

Further, the stimulable phosphor layer preferably has a vapor phase growth rate of 0.05-300 μm/min. In the case of a vapor phase growth rate of less that 0.05 μm/min, low productivity of the radiation image conversion panel of the present invention unfavorably results. Further, in the case of a vapor phase growth rate exceeding 300 μm/min, difficult control of the vapor phase growth unfavorably results.

In cases where a radiation image conversion panel is obtained via the foregoing vacuum evaporation method, the sputtering method or the like, a radiation image conversion panel exhibiting favorable sensitivity and resolution can be preferably obtained since filling density of the stimulable phosphor can be increased because of absence of a binder.

The film thickness of the foregoing stimulable phosphor layer varies depending on the intended use of the radiation image conversion panel and kinds of the stimulable phosphor, but from the viewpoint of producing effects of the present invention, the stimulable phosphor layer preferably has a thickness of 50-1000 µm, more preferably has a thickness of 100-600 µm, and still more preferably has a thickness of 100-500 µm.

As to temperature of the substrate on which a stimulable phosphor player is formed, a stimulable phosphor layer via the above-described vapor phase growth method is preferably prepared by controlling the substrate temperature to temperature higher than softening temperature of a subbing layer obtained by processing a substrate material, or higher than the lower one of melting temperature. Further, in order to control temperature, the temperature is controlled by heating a substrate from the back surface of the substrate to preferably conduct evaporation.

The stimulable phosphor layer in the radiation image conversion panel is farmed via vapor phase growth of the stimulable phosphor. The stimulable phosphor forms columnar crystals during layer formation.

In order to form the stimulable phosphor layer in the form of columnar crystals via evaporation, sputtering or the like, stimulable phosphors are employed, but among these, phosphor represented by the following Formula (2) is preferable, and further, specifically, CsBr based phosphor is preferably usable.

CsX:A        Formula (2)

wherein X represents Br or I, and A represents Eu, In, Tb, Tl, or Ce.

In a method of forming a phosphor layer on a substrate via a vapor deposition method, a stimulable phosphor layer composed of independently elongated columnar crystals can be prepared by supplying vapor or raw material of the stimulable phosphor via a vapor phase growth (namely vapor deposition) method such as an evaporation method. In these cases, conventionally, the shortest distance between the substrate and a crucible is preferably set to 10-60 cm, adjusting the average range of the stimulable phosphor.

The stimulable phosphor as a vapor source is placed in the crucible after being homogeneously dissolved or after being molded with a press or hot press. In this case, it is preferable to carry out a degassing treatment. To vaporize the stimulable phosphor from the vapor source, scanning of electron beams generated from an electron gun is conducted, but vaporization may be made via any other appropriate methods.

Further, the vapor source is not necessarily stimulable phosphor, but may be a mixture with the stimulable phosphor raw material.

Further, an activator may be doped in a base material of the phosphor afterward. For example, after exaporating only CsBr serving as a base material, Tl as an activator may be doped. Namely, since the crystals each are independent, doping can be adequately carried out even though the film thickness is large, and crystal growth is difficult to be produced, whereby MTF is not lowered.

In addition, concerning columnar crystals grown by the foregoing method, the tip of the columnar crystal commonly becomes thinner than the base portion of the columnar crystal. Consequently, phosphor layer strength in the surface area tends to become weak, whereby damage is easy to result unless a cleaning method is controlled. Further, since the phosphor layer contains no resin, the hardness is high. Consequently, external stress is concentrated in the protective layer, whereby cracks are easy to be generated in the protective layer.

Stimulated luminescence can be preferably reflected when a layer containing a white pigment is provided in the lower part of the phosphor layer. Examples of the white pigment include $TiO_2$ (anatase or rutile type), MgO, $PbCO_3.Pb(OH)_2$, $BaSO_4$, $Ai_2O_3$, M(II)FX {provided that M(II) is at least one of Ba, Sr and Ca, and X is at least one of Cl and Br}, $CaCO_3$, ZnO, $Sb_2O_3$, $SiO_2$, $ZrO_2$, lithopone ($BaSO_4.ZnS$), magnesium silicate, basic silicosulfate, basic lead phosphate, aluminum silicate, and so forth. Since these white pigments exhibit excellent opacifying properties and high refractive index, light may be reflected or refracted. Therefore, sitimulated luminescence is easily scattered, resulting in markedly enhanced sensitivity of the resulting radiation image conversion panel.

Further, usable examples of high optical absorption material include carbon black, chromium oxide, nickel oxide, iron oxide, and blue colorants. Of these, carbon black absorbs stimulated luminescence as well.

Further, colorants may be organic colorants or inorganic colorants. Examples of organic colorants include Zabon First Blue 3G (produced by Hoechst AG), Estrol Bril Blue N-3RL (produced by Sumitomo Kagaku Co., Ltd.), D & C Blue No. 1 (produced by National Aniline Co.), Spirit Blue (produced by Hodogaya Kagaku Co., Ltd.), Oil Blue No. 603 (Produced by Orient Chemical Industries, Ltd.), Kiton Blue A (produced by Ciba Geigy Co.), Eisen Catilon Blue GLH (produced by Hodogaya Kagaku Co., Ltd.), Lake Blue AFH (produced by Kyowa Sangyo Co., Ltd.), Primocyanine 6GX (produced by Inahata Sangyo Co., Ltd.), Brilacid Green 6BH (produced by Hodogaya Kagaku Co., Ltd.), and Cyan Blue BNRCS (Produced by Toyo Ink Co., Ltd.), Lyonoyl Blue SL (Produced by Toyo Ink Co., Ltd.), and so forth. There are also exemplified organic metal complex salt colorants such as Color Index Nos. 24411, 23160, 74180, 74200, 22800, 23154, 23155, 24401, 14830, 15050, 15760, 15707, 17941, 74220, 13425, 13361, 13420, 11836, 74140, 74380, 74350, 74460 and so forth. Examples of inorganic colorants include ultramarine blue, cobalt blue, celurean blue, chromium oxide and $TiO_2$—ZnO—Co—NiO based pigments.

[Protective Layer]

A protective layer may be formed by directly coating a protective layer coating solution onto a stimulable phosphor layer, or a protective layer having been formed in advance, may be attached onto the stimulable phosphor layer. Alternatively, the stimulable phosphor layer may be formed on a protective layer having been separately formed. As materials used for the protective layer, commonly-used protective layer materials are used, and examples thereof include cellulose acetate, nitrocellulose, polymethyl methacrylate, polyvinyl butyral, polyvinyl formal, polycarbonate, polyester, polyethylene terephthalate, polyethylene, polyvinilidene chloride, nylon, polytetrafluoroethylene, polytrifluoro-ethylene chloride, tetrafluoroethylene-hexafluoropropylene copolymer, vinylidene chloride-vinyl chloride copolymer, and vinylidene chloride-acrylonitrile copolymer, and so forth. There may also be employed a transparent glass substrate as the protective layer. Further, the protective layer may be formed by laminating an inorganic material such as SiC, $SiO_2$, SiN, $Al_2O_3$ or the like via an evaporation method, a sputtering method or the like. Conventionally, the protective layer preferably has a layer thickness of approximately 0.1-2000 µm.

(Cleaning Method)

In the case of a cleaning method of the present invention, the surface of a protective layer is cleaned by moving a cleaning member, while the surface of the protective layer provided on a phosphor layer is subjected to applying a pressure of 1 $mN/cm^2$-1 $N/cm^2$.

Pressure of the present invention means force per unit area of the contact surface between the cleaning member and a panel, wherein the force is force pressing the cleaning member via a hand or a jig. A specific method to determine the pressure is a method by which the panel is placed on an electronic balance to measure a load during application of stress with the hand or the jig, and the area of the cleaning member brought into contact with the panel is further measured to calculate the pressure from these values.

"While the surface of the protective layer is subjected to applying a pressure of 1 mN/cm$^2$-1 N/cm$^2$" means that cleaning is conducted while applying pressure in the foregoing range in the direction perpendicular to the surface of the protective layer. "Moving a cleaning member" means that the cleaning member is moved in the direction parallel to the surface of the protective layer. However, when using a rotatable cleaning member, "being moved" means "being rotated".

Examples of materials for the cleaning member include cotton, nonwoven fabric, felt, rubber and so forth. As the cleaning member, a base material in the form of a sheet exhibiting a thickness deformation ratio of the cleaning member of 20-80% when applying a pressure of 1N/cm$^2$, or an adhesion roller is preferably usable.

Examples of the base material in the form of a sheet exhibiting a thickness deformation ratio of the cleaning member of 20-80% when applying a pressure of 1N/cm$^2$ include cotton, nonwoven fabric, felt and so forth. "Thickness deformation ratio of the cleaning member" means a ratio of reduced thickness of the cleaning member in the form of a sheet when applying pressure to thickness of the cleaning member in the form of a sheet before applying pressure.

In the present invention, the cleaning member having the above-described deformation ratio is brought into contact with the protective layer at the above-described pressure, and the cleaning member is moved on the protective layer, that is, rubbing is done, whereby generation of scratches is inhibited, and dust can be sufficiently removed.

Another preferable embodiment of the present invention is an embodiment in which the cleaning member is an adhesion roller. As the adhesion roller, a roller having rubber exhibiting high adhesiveness on its surface is preferable. The adhesion roller preferably has an adhesive force of 0.05 N/10 mm-3.0 N/10 mm, and more preferably has an adhesive force of 0.1 N/10 mm-1.0 N/10 mm, provided that the values are obtained by measuring the force via tension at a speed of 30 cm/min and at an angle of 180° after preparing a base material in the form of a 10 mm wide sheet having a material constituting the surface of the adhesion roller to attach this base material in the form of a sheet onto a polished stainless plate.

That is, a cleaning method by which a roller exhibiting the above-described adhesive force is brought into contact with a protective layer at the above-described pressure is rather preferable.

In the present invention, accumulating of image information to a radiation image conversion panel is made upon exposure to X-ray in a situation where the panel is held in a box which no light enters such as a cassette (transportable case) or a dark box.

The phosphor layer is exposed to laser to read accumulated image information. The laser has a laser beam diameter of 100 μm or less, and preferably has a laser beam diameter of 80 μm or less.

Examples of the laser include He—Ne laser, He—Cd laser, Ar ion laser, Kr ion laser, N$_2$ laser, YAG laser and second harmonic wave thereof, ruby laser, semiconductor laser, various kinds of dye laser, metal vapor laser such as copper vapor laser or the like, and so forth. A continuous oscillation laser such as He—Ne laser or Ar ion laser is commonly desirable, but a pulse oscillation laser is also usable if the scanning time per pixel of the panel is synchronized with the pulse. Further, in the case of a separation method utilizing no filter, but retardation in luminance, as disclosed in Japanese Patent O.P.I. publication No. 59-22046, preferably usable are modulations made by the pulse oscillation laser rather than those made by continuous oscillation laser.

Of various kinds of laser light sources described above, a semiconductor laser is specifically preferable since it is compact and inexpensive, and no modulator is desired.

In a method of reading image information of the present invention, employed is an image reading apparatus equipped with a cleaning device composed of the foregoing cleaning member.

EXAMPLE

The present invention will be detailed referring to examples, but the present invention is not limited thereto.

Example 1

Preparation of Substrate

A substrate where a polyimide layer was provided on the surface of an aluminum plate having a square, 30 cm on a side with a thickness of 1 mm was prepared.

(Preparation of Panel)

First, stimulable phosphor (CsBr: 0.001Eu) was employed as an evaporation source, and Ar gas was introduced into a vapor deposition apparatus to adjust a vacuum degree to 0.133 Pa. The distance between a substrate and a raw material container was set to 60 cm; the substrate was rotated at a rotation speed of 10 rpm; temperature in the raw material container was maintained at 750° C. while keeping temperature of the substrate at approximately 150° C. for starting of evaporation; and the evaporation was terminated when the thickness of the stimulable phosphor layer reached 300 μm. Then, the pressure in the evaporation chamber was returned to atmospheric pressure to prepare a panel in which the stimulable phosphor layer was formed on the substrate.

Next, the surface of the stimulable phosphor layer was covered by a thin layer (film thickness: 2.0 μm) of a tetrafluoroethylene-hexafluoropropylene copolymer as a protective layer, and the support and the protective layer peripheral portion were sealed in dry air atmosphere with an adhesive to obtain a radiation image conversion panel having a structure in which a phosphor layer was sealed.

After the resulting radiation image conversion panel was set in a cassette for REGIUS190 manufactured by Konica Minolta Medical & Graphic, Inc., and hair dust was placed on the surface of radiation image conversion panel at the ratio of 150/cm$^2$, the entire surface of the radiation image conversion panel was exposed to X-ray at a tube voltage of 80 kVp. Cleaning members each shown in Table 1 were placed by modifying REGIUS190, and cleaning was conducted immediately before reading. Cleaning was conducted by each of cleaning methods 1-20 to conduct reading action of REGIUS190 for each. After repeating 100 times, the following evaluation was conducted.

(Evaluation Method)

—Surface Scratch—

Scratches in a square, 10 cm on a side in the center of a panel were visually counted.

1. Not less than 100 scratches are counted, and it can not be used.
2. Not less than 20 and less than 100 scratches are counted, and it can not be used.
3. Not less than 5 and less than 20 scratches are counted, but it is practically available.
4. Not less than 1 and less than 5 scratches are counted, but it is favorable.
5. No scratch is counted, but it is excellent.

—Image Defect—

The entire surface of a panel was exposed to X-ray at a tube voltage of 80 kVp, and data was read out employing REGNUS190 to store the data in a hard disk installed in image processing apparatus CS-3. The stored data were output by a laser imager to visually conduct evaluation made on a Schaukasten. The evaluation is made with the following 5 ranks, and the results are shown in Table 1.

1. Not less than 100 image defects are counted, and it can not be used.
2. Not less than 20 and less than 100 image defects are counted, and it can not be used.
3. Not less than 5 and less than 20 image defects are counted.
4. Not less than 1 and less than 5 image defects are counted, but it is favorable.
5. No image defect is counted, but it is excellent.

—Image Unevenness—

1. Unevenness is observed in the area of not less than 50% of an image, and it can not be used.
2. Unevenness is observed in the area of not less than 25% and less than 50% of an image, and it can not be used.
3. Unevenness is observed in the area of not less than 5% and less than 25% of an image, and it is practically available.
4. Unevenness is observed in the area of less than 5% of an image, and it is practically available.
5. No unevenness is observed.

TABLE 1

| Cleaning method | Cleaning member | Thickness deformation ratio (%) | Pressure (mN/cm$^2$) | Adhesive force (g/10 mm) | Surface scratch | Image defect | Image unevenness | Remarks |
|---|---|---|---|---|---|---|---|---|
| 1 | Brush | — | — | — | 1 | 1 | 1 | Comp. |
| 2 | Cotton in the form of a sheet | 75 | 5 | — | 4 | 3 | 4 | Inv. |
| 3 | *1 | 30 | 0.5 | — | 3 | 2 | 1 | Comp. |
| 4 | *1 | 30 | 1 | — | 5 | 5 | 4 | Inv. |
| 5 | *1 | 30 | 5 | — | 5 | 5 | 5 | Inv. |
| 6 | *1 | 30 | 100 | — | 4 | 5 | 4 | Inv. |
| 7 | *1 | 30 | 500 | — | 4 | 3 | 4 | Inv. |
| 8 | *1 | 30 | 1000 | — | 3 | 3 | 4 | Inv. |
| 9 | *1 | 30 | 1500 | — | 1 | 3 | 2 | Comp. |
| 10 | *1 | 20 | 5 | — | 4 | 4 | 5 | Inv. |
| 11 | *1 | 10 | 5 | — | 3 | 4 | 4 | Inv. |
| 12 | *1 | 80 | 5 | — | 5 | 4 | 4 | Inv. |
| 13 | *1 | 90 | 5 | — | 5 | 4 | 3 | Inv. |
| 14 | *2 | 20 | 10 | — | 3 | 4 | 4 | Inv. |
| 15 | *2 | 40 | 10 | — | 4 | 5 | 5 | Inv. |
| 16 | *3 | — | 3 | 0.01 | 4 | 3 | 4 | Inv. |
| 17 | *3 | — | 3 | 0.5 | 5 | 5 | 5 | Inv. |
| 18 | *3 | — | 3 | 2 | 5 | 4 | 4 | Inv. |
| 19 | *3 | — | 3 | 4 | 3 | 4 | 3 | Inv. |

*1: Nonwoven fabric in the form of a sheet,
*2: Felt in the form of a sheet
*3: Rubber adhesion roll,
Comp.: Comparative example,
Inv.: Present invention As is clear from Table 1, it is to be understood that in the case of cleaning methods of the present invention, scratches on the surface of a radiation image conversion panel, image defects and image unevenness are reduced.

The invention claimed is:

1. A method of cleaning a radiation image conversion panel comprising a substrate and provided thereon, a phosphor layer, and further comprising a protective layer provided on the phosphor layer, the method comprising:

cleaning a surface of the protective layer is cleaned by moving a cleaning member in a direction parallel to surface of the protective layer while rotating the cleaning member and applying a pressure of 1 mN/cm$^2$ 1 N/cm$^2$ to the surface of the protective layer with the cleaning member, and wherein the cleaning member is an adhesion roller having an adhesive force of 0.05-3.0 N/10 mm.

2. The method of claim 1, wherein the phosphor layer comprises a plurality of columnar crystals in which a tip of each of the columnar crystals is thinner than a base portion of the each.

3. The method of claim 1, wherein the cleaning member comprises a base material in the form of a sheet exhibiting a thickness deformation ratio of the cleaning member of 20-80%, when applying a pressure of 1N/cm$^2$.

4. The method of claim 1,
wherein the phosphor layer comprises CsBr as a phosphor.

5. A method of reading image information, comprising the step of:
reading the image information via accumulation of the image information in radiation image conversion panel comprising a substrate and provided thereon a phosphor layer on which a protective layer is provided,
wherein the method comprises a cleaning process before reading the image information or before accumulating the image information, by the method of claim 1.

6. An image information reading apparatus employed for the method of claim 5, comprising a cleaning device comprising a cleaning member.

* * * * *